(12) United States Patent
Phung et al.

(10) Patent No.: US 9,449,025 B1
(45) Date of Patent: Sep. 20, 2016

(54) DETERMINING SIMILARITY USING HUMAN GENERATED DATA

(71) Applicant: A9.com, Inc., Palo Alto, CA (US)

(72) Inventors: Michael Q. Phung, San Jose, CA (US); Arnab S. Dhua, Mountain View, CA (US); Ketan R. Deshpande, San Jose, CA (US); Sunil Ramesh, San Jose, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 14/800,462

(22) Filed: Jul. 15, 2015

Related U.S. Application Data

(63) Continuation of application No. 13/482,717, filed on May 29, 2012, now Pat. No. 9,104,701.

(51) Int. Cl.
*G06K 9/54* (2006.01)
*G06F 17/30* (2006.01)

(52) U.S. Cl.
CPC ..... *G06F 17/30256* (2013.01); *G06F 17/3005* (2013.01); *G06F 17/30047* (2013.01); *G06F 17/30277* (2013.01)

(58) Field of Classification Search
None
See application file for complete search history.

(56) References Cited

U.S. PATENT DOCUMENTS

| | | | |
|---|---|---|---|
| 8,447,107 B1 * | 5/2013 | Dhua | G06K 9/4604 |
| | | | 382/170 |
| 2011/0075917 A1 | 3/2011 | Cerosaletti et al. | |
| 2011/0119287 A1 | 5/2011 | Chen et al. | |
| 2011/0158558 A1 | 6/2011 | Zhao et al. | |

OTHER PUBLICATIONS

Non Final Office Action dated Jul. 17, 2014; U.S. Appl. No. 13/482,717.
Final Office Action dated Dec. 19, 2014; U.S. Appl. No. 13/482,717.
Notice of Allowance dated Apr. 17, 2015; U.S. Appl. No. 13/482,717.

* cited by examiner

*Primary Examiner* — Stephen R Koziol
*Assistant Examiner* — Amandeep Saini
(74) *Attorney, Agent, or Firm* — Hogan Lovells US LLP

(57) ABSTRACT

Subjective user-generated data can be utilized to determine visually similar items. Various item descriptors can be determined for a pair of items, which can provide an objective measure of visual aspects of those items, such as how similar those items are in color, style, material, or texture. The ways in which users interact with data for those items, either explicitly or implicitly through user behavior, can provide a level of perceived visual similarity on behalf of these users. The perceived, subjective visual similarity data from the users can be used to adjust a weighting of the various item descriptor factors for a pair of items, or otherwise adjust a visual similarity score, such that items selected as being visually similar more accurately reflect the subjective opinions of the users.

20 Claims, 6 Drawing Sheets

DETERMINING SIMILARITY USING HUMAN GENERATED DATA

CROSS-REFERENCES TO RELATED APPLICATIONS

This application is a continuation of allowed U.S. application Ser. No. 13/482,717, entitled "DETERMINING SIMILARITY USING HUMAN GENERATED DATA," filed May 29, 2012; of which the full disclosure of this application is incorporated herein by reference for all purposes.

BACKGROUND

Electronic devices are increasingly enabling users to locate information in different ways. For example, a user wanting information about an item such as a book can perform a search to locate information about the book, or can navigate through the Website of an online retailer to locate a page of information about the book. In addition, a user can capture an image of a copy of the book using a camera of a portable computing device and cause that image to be matched against a database of images in order to identify the item and provide the user with information about that item. In addition to providing this information, applications can also suggest related items in which the user might be interested. The algorithms used to determine these items typically rely upon objective criteria, such as books by the same author or in the same category, and are unable to take into account what a user might subjectively think to be a related item, or which aspects of an item are most important in determining similarity.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to determining a similarity between items, as may be useful for suggesting similar items to a user. In particular, various embodiments utilize human generated data in order to determine, weight, and/or adjust similarity scores for various items. The use of similarity data enables subjective criteria of various users to be utilized with objective criteria defined in a computing system to improve visual similarity determinations for various types of users and/or various types of items. The subjective user similarity data can be determined by monitoring user interactions in an electronic environment, as well as by presenting users with specific items and asking for an indication of the perceived similarity.

Various other functions and advantages are described and suggested below as may be provided in accordance with the various embodiments.

Figure 1:
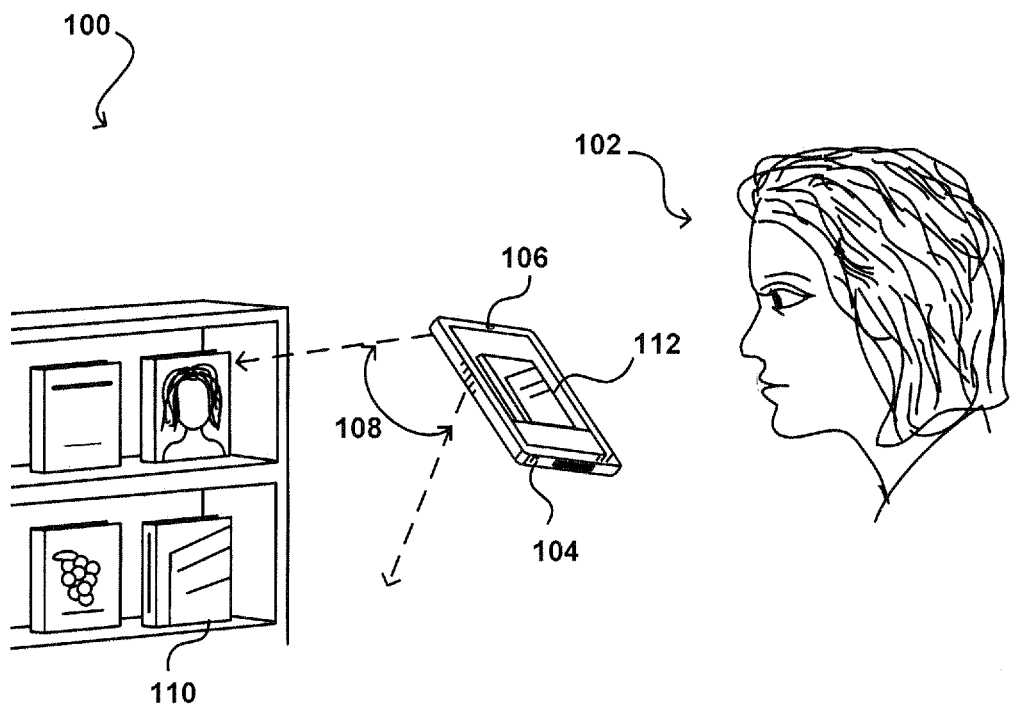
FIG. 1 illustrates an example environment in which aspects of the various embodiments can be implemented.

FIG. 1 illustrates an example environment 100 in which aspects of the various embodiments can be implemented. In this example, a user 102 is in a store that sells various items, and is interested in obtaining information about a particular book 110. Using an appropriate application executing on a computing device 104, the user is able to obtain an image of the book 110 by positioning the computing device such that the book is within a field of view 108 of at least one camera 106 of the computing device. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among others.

In this example, a camera 106 on the device 104 can capture image information including the book 110 of interest, and at least a portion of the image can be displayed on a display screen 112 of the computing device. At least a portion of the image information can be analyzed and, upon a match being located, identifying information can be displayed back to the user via the display screen 112 of the computing device 104. The portion of the image to be analyzed can be indicated manually, such as by a user pointing to the book on the screen or drawing a bounding box around the book. In other embodiments, one or more image analysis algorithms can attempt to automatically locate one or more objects in an image. In some embodiments, a user can manually cause image information to be analyzed, while in other embodiments the image information can be analyzed automatically, either on the device or by transferring image data to a remote system or service as discussed later herein.

Figure 2:
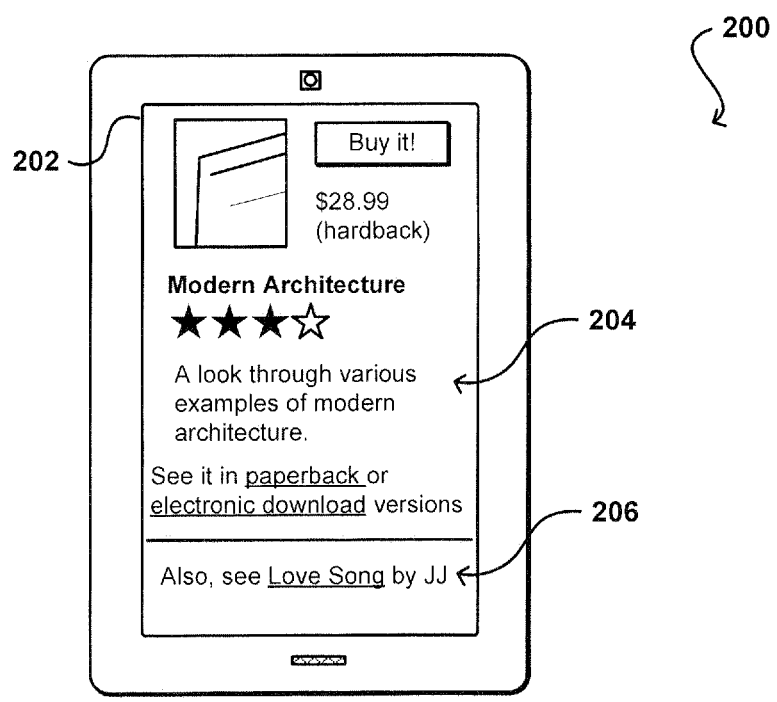
FIG. 2 illustrates example display that can be presented in accordance with various embodiments.

FIG. 2 illustrates an example of a type of information 204 that could be displayed to the user via a display screen 202 of a computing device 200 in accordance with various embodiments. In this example, the image captured by the user has been analyzed and related information 204 is displayed on the screen. The "related" information as discussed elsewhere herein can include any information related to an object, item, product, or other element that is matched (within at least a level of confidence) to the image data using one or more matching or identifying algorithms, or other such approaches. These can include, for example, image recognition algorithms, object identification algorithms, facial recognition algorithms, optical character recognition algorithms, barcode recognition algorithms, text recognition algorithms, or any other such approaches or techniques. The displayed information in this example includes the title of the located book, an image of the book (as captured by the user or otherwise obtained), pricing and description information, and review information. Also as shown are options to purchase the book, as well as options for various other versions or forms of that content, such as a paperback book or digital download. The type of information displayed (or otherwise conveyed) can depend at least in part upon the type of content located or matched. For example, a located book might include author and title information, as well as formats in which the book is available. For facial recognition, the information might include name, title, and contact information. Various other types of information can be displayed as well within the scope of the various embodiments.

A display of information such as that illustrated in FIG. 2 can be obtained in other ways as well. For example, the user could have entered text information for the book into a search engine and selected a search result corresponding to the page of the information. Similarly, the user could have accessed a Web site or application of an online retailer or provider of an electronic marketplace, and could have navigated through a book category to obtain the information. The user also could have obtained an image of the book from another source, and provided that image for matching or search, etc. Various other approaches could be used as well within the scope of the various embodiments.

In the example display 200 of FIG. 2, the interface corresponds to a page of an electronic marketplace, where the user is able to view information about the item and potentially purchase or otherwise obtain a copy of the book. In many such situations, an online retailer or other such entity will provide one or more similar items in which the user might also be interested. Similarly, if the user provided text or an image as a search query, a search engine typically will want to provide similar results to the user. Suggested similar or related results or items are utilized in various other contexts as well.

Figure 3A:
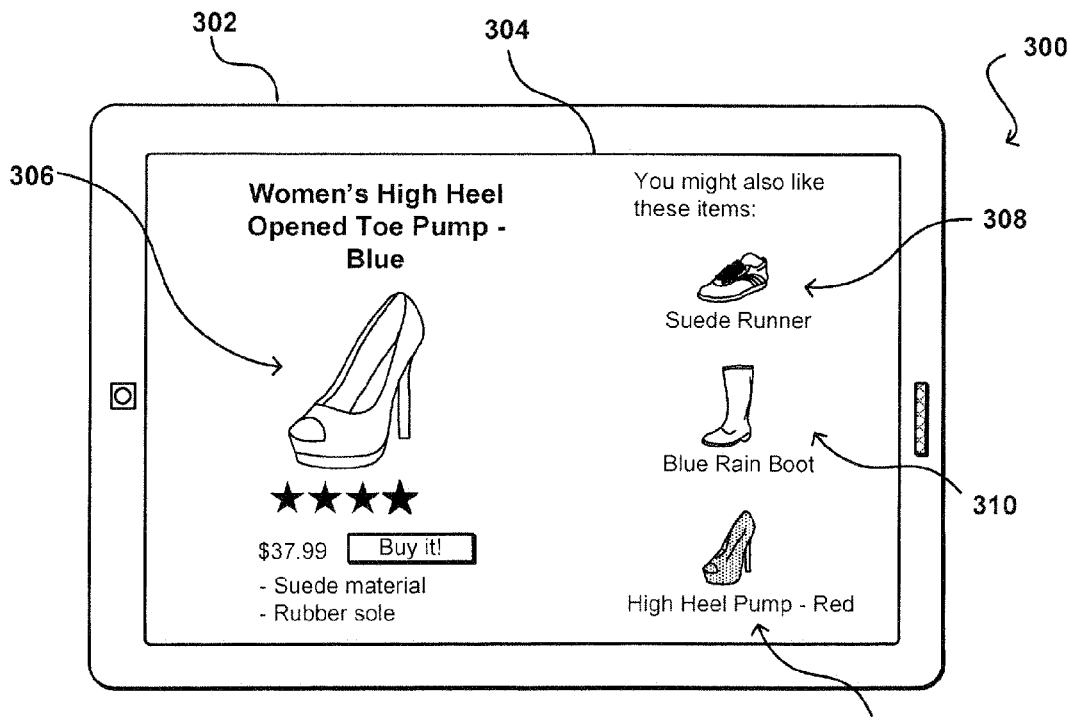
FIGS. 3(a) and 3(b) illustrate example interface displays that can be presented in accordance with various embodiments.

FIG. 3(a) illustrates an example situation 300 wherein a user has accessed a page of information that is displayed on a display screen 304 of a computing device 302. As mentioned above, the user could have arrived at this page along various different paths, such as by capturing or providing an image of a shoe for matching, entering a search query, navigating to a specific page of information, etc. In this example, the item of interest is a particular pair of shoes, and information including an image 306 of one of the shoes is provided for display to the user. The display also includes information for a selection of other items 308, 310, 312 that have been determined to be visually similar to the shoe of interest 306 in at least one way.

In at least some similarity and/or recommendation engines, various objective criteria can be used to determine how similar one item is to another, at least from a visual perspective. These criteria will be referred to herein as "item descriptors" or "visual descriptors." There can be various visual item descriptors for an item, which can vary by the type of item. For example, shoes might have descriptors that relate to visual aspects of the shoes, such as style, color, pattern, material, shape, and texture, among other such descriptors. The items selected as similar items can be strongly similar to the primary item of a page for at least one of these visual descriptors. For example, a first item 308 is selected because it is made of the same material, or has the same visual texture, as the primary item 306. A second item 310 is selected because it is very similar in color to the primary item 306. A third item 312 is selected because it is very similar in style to the primary item 306. Various other selection criteria can be used as well.

For each pair of items, including a primary item and a potentially similar item, a relatedness score can be determined for each of the item descriptors for that type of item. For example, scores can run from 0 to 100 for the various relatedness scores in one embodiment, with 0 being totally unrelated and 100 being essentially the same. Other ranges can be used as well in other embodiments. In one example, a black shoe might have a score of around 100 with respect to another black shoe, but might have a score of around 0 for a white shoe. A range of scores can be determined such that a red shoe might have a value between 0 and 100 with respect to a black shoe, with a darker red having a higher relatedness score than a lighter red shoe. Similarly, a leather shoe might have a higher relatedness score to a suede shoe than to a wooden shoe.

A selection algorithm might utilize a combination of these relatedness scores to determine an overall relatedness score for each pair of items, which can be used to select one or more items to suggest with the primary item. For example, a formula can be used that determines similarity based on descriptors by:

$$relatedness = \frac{style + color + texture}{3}$$

where each of the three descriptors counts equally to the relatedness score. Thus, for the first item 308 made with the same material, the relatedness score could be determined to be (20+52+75)/3=49. If three similar items are to be shown, and 49 is one of the top three relatedness scores, that item can be selected to be displayed to the user. It should be understood that various information such as categories, user preferences, past purchase history, and other factors can be considered as well within the scope of the various embodiments, as is known for suggesting related items.

In many cases, however, users will not consider all those descriptors equally. For example, a man looking to buy black leather shoes for work might not care very much about the particular style of shoe, and in fact might not have a style in mind, but might be most interested in black shoes first, then shoes that at least look like leather. Thus, if a provider was to suggest similar items to a user, the provider could provide more appropriate suggestions if the provider knew that color should be weighted more heavily than texture, which should be weighted substantially more than style (at least within a specified category of shoe—such as dress shoes). A woman looking for high heels, on the other hand, might be primarily interested in shoes with a similar style, such as may have the same type of heel, height of heel, open or closed toe, strap or strapless, etc. The woman might be interested in color next, and visual texture last. Various other situations and combinations can be envisioned as well.

Taking the primary item 306 in FIG. 3(a), if a provider system could obtain data as to what shoppers of that shoe consider to be similar items, and how much each item descriptor contributes to that similarity, the provider can select suggestions that might be more of interest to the user. For example, consider the following data for two shoes where a subjective weighting is applied to the objective relatedness data:

| descriptor | score | weighting |
|---|---|---|
| color | 75 | 45% |
| style | 20 | 30% |
| texture | 52 | 25% | similarity = .45 * 75 + .30 * 20 + .25 * 52 = 52.75

Thus, the scores of each descriptor can be weighted according to how a type of user would likely consider each factor in determining similarity. When the same descriptor values were equally weighted above, the overall score was determined to be 49. By adjusting the weighting of the various factors according to the subjective user data, the similarity score for the pair of items has increased since this type of user typically considers color to contribute more to visual similarity than style, which is considered to be slightly more important in determining similarity than texture.

Figure 3B:
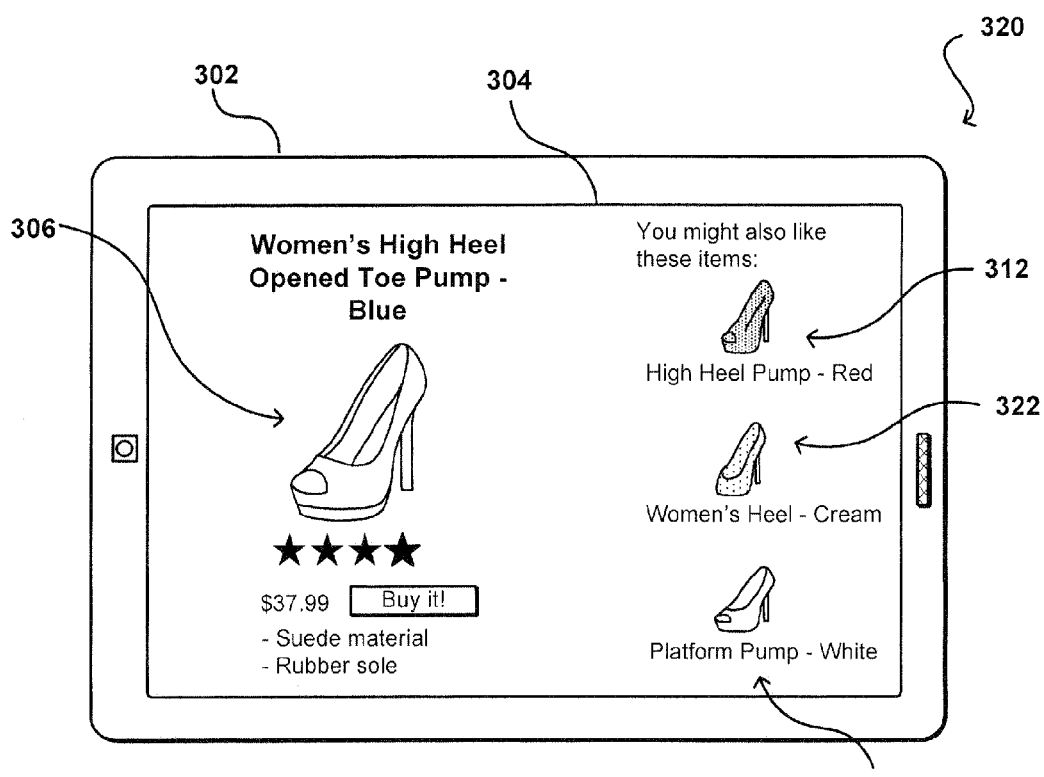

Using such a formula, different results can be selected for the primary item 306 in FIG. 3(*a*). For example, FIG. 3(*b*) illustrates an example situation 320 wherein one of the shoes 312 that was most similar in style is still suggested to the user, but two new items 322, 324 have been selected which are closer in style to the primary item 306, and thus have higher scores than the previously displayed items 308, 310 once the subjective weightings are applied to the similarity formula. As can be seen, the suggestions still have different styles, colors, and textures, but the styles are closer to that of the primary item 306 and the higher style weighting has caused those items to have higher similarity scores with respect to the primary item, and thus be ranked more highly on a list of similar items.

In some cases, the weighting factors might be determined for an individual user as well. For many users, however, the user will not make enough purchases or view enough items to enable an accurate determination of subjective similarity weighting data for a large number of categories of items. In at least some situations, however, a user can provide indication of which descriptors might most important to the user. The user can provide this explicitly in some embodiments, such as where an interface enables a user to find items that are most similar in color, style, etc. Alternatively, a system or service might monitor how that user browses or searches for items, and might determine which descriptor is most important to the user. For example, a certain user might always look for a certain color of shoe when shopping, such that when a user looks at a particular shoe the user also looks at other shoes of a similar color. By monitoring the viewing patterns of the user, the system can infer that, at least when shopping for shoes, this user often considers color very highly when looking for similar items.

In such cases, the system might use the overall descriptor weightings for a category or type of item, but might adjust one or more of the weightings according to the particular user. For example, using the example formula and numbers above, a user who considers color the most important factor when looking for similar items can have the color weighting doubled, or otherwise adjusted, when determining similarity scores. Thus, when doubling the relative weighting of color in the example, the effective weightings change to 62% for color, 21% for style, and 17% for texture, resulting in a similarity score of 59.54 for the pair, which is higher than either of the previous similarity scores for that item with respect to the primary item.

Figure 4:
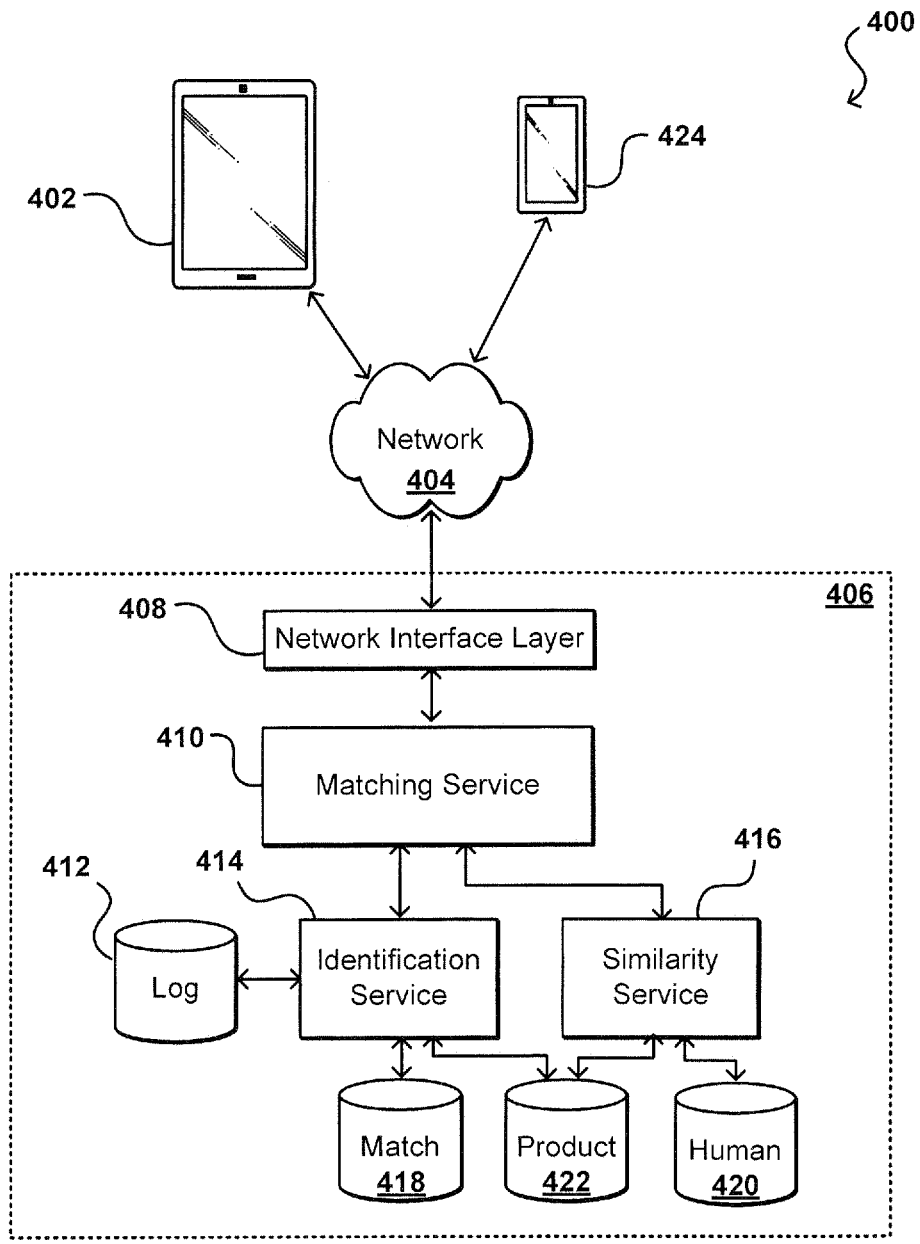
FIG. 4 illustrates an example system for identifying items and suggesting related items that can be utilized in accordance with various embodiments.

FIG. 4 illustrates an example environment 400 in which subjective user data can be captured, analyzed, and utilized to generate similarity determinations in accordance with various embodiments. In this example, a user of a computing device 402 is able to provide information relating to an item of interest. As discussed, this can involve selecting a page relating to that item, capturing an image of that item using a camera of the computing device 402, uploading an existing image of that item, etc. The information for the item, which can include image, video, or text information, among other such options, can be transmitted from the computing device 402 across at least one appropriate network 404 to attempt to obtain information relating to the item. The network 404 can be any appropriate network, such as may include the Internet, a local area network (LAN), a cellular network, and the like. The request can be sent to an appropriate content provider 406, as may provide one or more services, systems, or applications for processing such requests. The information can be sent by streaming, uploading, or otherwise transferring the information using at least one appropriate communication channel.

In this example, the request is received to a network interface layer 408 of the content provider 406. The network interface layer can include any appropriate components known or used to receive requests from across a network, such as may include one or more application programming interfaces (APIs) or other such interfaces for receiving such requests. The network interface layer 408 might be owned and operated by the provider, or leveraged by the provider as part of a shared resource or "cloud" offering. The network interface layer can receive and analyze the request, and cause at least a portion of the information in the request to be directed to an appropriate system or service, such as a matching service 410. A matching service in this example includes components operable to receive image data about an item, analyze the image data, and return information relating to one or more items that are determined to match an item in the received data.

The matching service 410 in this example can cause information to be sent to at least one identification service 414, device, system, or module that is operable to analyze the data, such as an image or video, and attempt to locate one or more matches for an item reflected in the data. In at least some embodiments, an identification service 414 will process the received data, such as to extract points of interest or unique features in a captured image, for example, then compare the processed data against data stored in a matching data store 418 or other such location. In other embodiments, the unique feature points, image histograms, or other such information about an image can be generated on the device 402 and uploaded to the matching service, such that the identification service can use the processed image information to perform the match without a separate image analysis and feature extraction process. Certain embodiments can support both options, among others. The data in an image matching data store 418 might be indexed and/or processed to facilitate with matching, as is known for such purposes. For example, the data store might include a set of histograms or feature vectors instead of a copy of the images to be used for matching, which can increase the speed and lower the processing requirements of the matching. Approaches for generating image information to use for image matching are well known in the art and as such will not be discussed herein in detail.

The matching service 410 can receive information from each contacted identification service 414 as to whether one or more matches could be found with at least a threshold level of confidence, for example, and can receive any appropriate information for a located potential match. The information from each identification service can be analyzed and/or processed by one or more applications of the matching service, such as to determine data useful in obtaining information for each of the potential matches to provide to the user. For example, a matching service might receive bar codes, product identifiers, or any other types of data from the identification service(s), and might process that data to be provided to a service such as a similarity service 416 that is capable of locating information about one or more items that are determined to be similar to a located potential match.

In at least some embodiments, an similarity service 416 might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the similarity service 416 can utilize data from the matching service 410, such as an identifier for an object determined to match the item of interest, in order to locate products, in a product data store 422 or other such location, which are offered through the marketplace and that match, or are otherwise related to, the identified object. As discussed, the similarity service 416 can look at products related to the identified item of interest, and can determine the relatedness scores for at least a portion of those products with respect to the item of interest. In at least some embodiments, the similarity service can extract subjective human-generated data from at least one human generated data store 420 for use in determining appropriate weightings, factors, or other adjustments to be used in determining the similarity scores for each pair of items. As discussed, data specific to the user making the request can be utilized as well in at least some embodiments. The similarity service can then rank the potentially similar items by the generated similarity scores, and can provide at least a determined number of the top ranked results (or other appropriate selection) to the client device 402 as a set of similar items. If the user of the client device 402 selects any of these similar items for viewing or purchase, or does not select one or more of these items, that information can be fed back into the similarity service 416 for use in adjusting a weighting of one or more item descriptors for that type of item that are used to generate the similarity scores. For example, if the user does not express interest in any of the items, the weightings might be moved back toward an even weighting. If the user selects only items that are of a similar color, the color descriptor might get a more heavy weighting. Various metric learning approaches can be used to continually monitor user interactions and update the subjective user similarity data over time. When a subsequent request for that type of item is received from a user of another device 424, for example, the updated weightings can be used to determine a set of updated ranking scores, and select a set of suggested items that might be the same as, or different from, the set that was presented to the user of the first device 402. The ability to dynamically adjust the weighting factors also enables the system to adapt to changes in preference, such as where relative preferences for similar styles or color vary with trends over time. In some embodiments, information for the selected similar items can be written to a log data store 412 or other such location in order to assist with future matches or suggestions, as well as to help rate a performance of a given similarity service. As should be understood, each service can include one or more computing components, such as at least one server, as well as other components known for providing services, as may include one or more APIs, data storage, and other appropriate hardware and software components.

Figure 5:
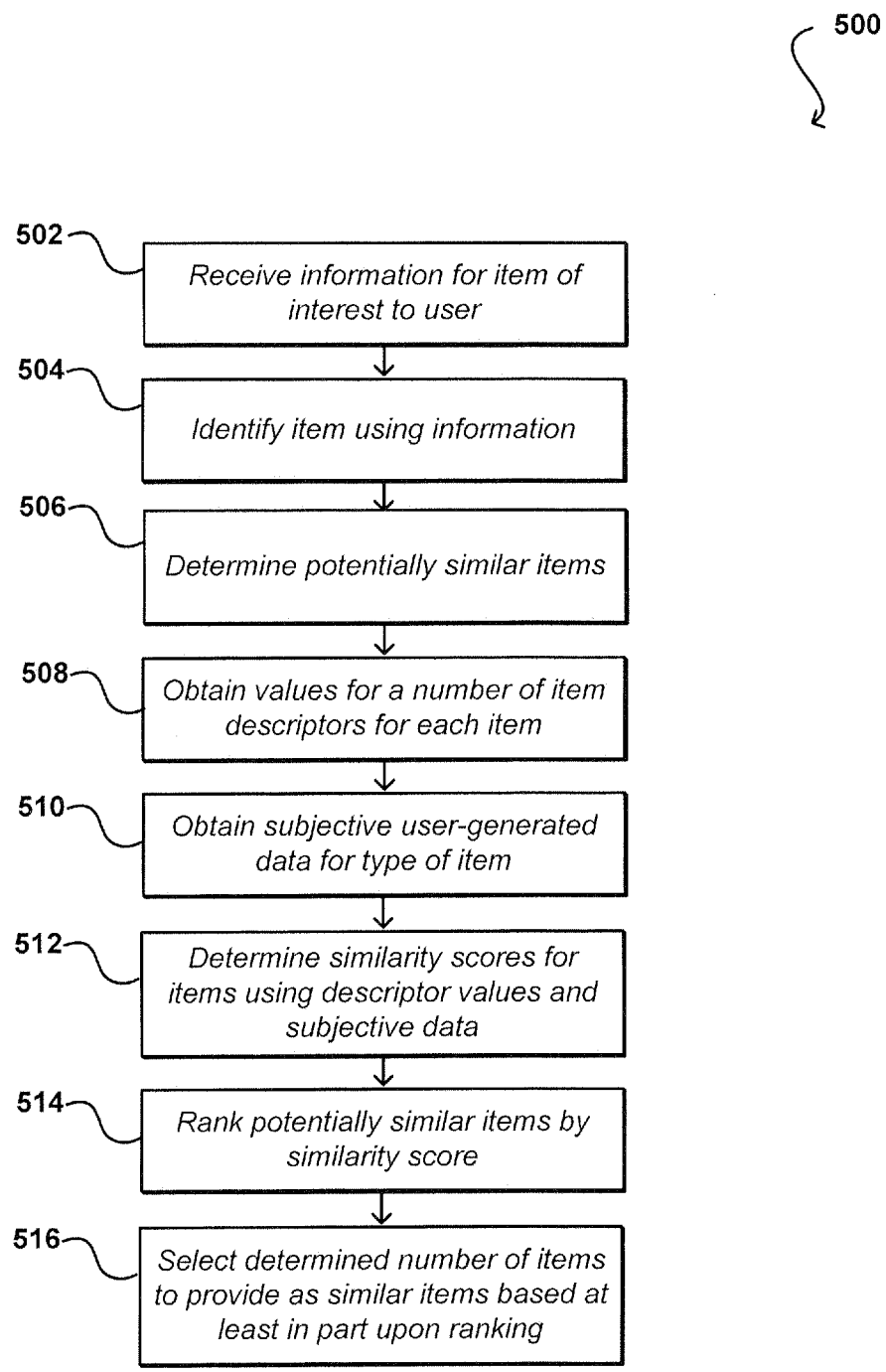
FIG. 5 illustrates an example process for determining similar items that can be used in accordance with various embodiments.

FIG. 5 illustrates an example process 500 for determining similar items to present to a user that can be utilized in accordance with various embodiments. It should be understood that there can be additional, fewer, or alternative steps performed in similar or alternative orders, or in parallel, within the scope of the various embodiments unless otherwise stated. In this example, information relating to an item of interest is received 502 on behalf of a user. As mentioned, the information can include image, video, text, or other such information. The item can be identified 504 based at least in part on the received information, such as by performing image matching, executing a search, or performing another such action as discussed and suggested elsewhere herein. After identifying the item, potentially similar or related items can be determined 506, such as by locating information for items of a common type with the item of interest, items within the same category of item, etc. For at least a portion of these potentially similar items, values can be obtained 508 for a number of item descriptors, where those values correspond to a determined similarity or relatedness of the item of interest to a potentially similar item according to the determined descriptor. As discussed, item descriptors can include aspects such as style, color, shape, texture, material, and other such information. Subjective user-generated data can also be obtained 510. As discussed, the user-generated data can provide an indication of how much each item descriptor should be factored into a similarity determination for a type of the item of interest. Such information can be based upon user actions, explicitly provided user similarity input, or other such information. A similarity score can then be determined 512 for each of at least a subset of the potentially similar items using the item descriptor values and the subjective user generated data. This can include, for example, determining a weighting to be applied to each item descriptor value using the user-generated data. The potentially similar items then can be ranked 514 according to the calculated similarity scores, and a determined number of the "top" ranked items can be provided 516 to the user as similar items to the item of interest. The top ranked items can be items with the highest or lowest scores, among other such selection criteria. As discussed, the user interaction with the provided items can be fed back into the system or service as further subjective user-generated data.

It may be the case, however, that for at least certain types of items there might not be enough user-generated data to provide adequate weightings. In some cases, there also might not be values for one or more item descriptors, if any at all. In such cases, user input might be utilized to attempt to obtain subjective information for use in determining the similarity of various items of that type. In some embodiments, a provider might utilize a service (offered by the provider or a third party) to attempt to obtain that subjective data. Such a service might have various users or customers who are willing to answer questions in return for some type of compensation, whether a discount, payment per answer, or other type of perk. Various types of tasks or questions can be presented to users in such situations. As an example, FIG. 6(*a*) illustrates an example situation 600 where a user is able to view information on a display element 604 of a computing device 602. In this example, a question 606 is presented to the user whereby the user is asked to indicate whether images 608, 610 of two items are similar. In at least some embodiments, the questions presented to a user will be directed at a particular type of user. For example, if the item is a designer woman's shoe, the target users might be women who tend to buy designer shoes, in order to get subjective similarity data that is likely similar to that which a customer viewing that shoe would provide. Users can be selected based on any appropriate criteria, such as gender, age, salary level, purchasing history, browse history, user profile data, and the like. In this example the user is only given two choices 612, indicating whether or not the items are similar. An overall score can be generated using data aggregated from multiple users answering that question. The various item descriptors can be considered when determining how to interpret the results. For example, in FIG. 6(*a*) the shoes are of a different type and a different material, but might be the same color. If few of the users say that these items are similar, then color might be given a relatively low weighting for this type of item. If both are patent leather and the user-generated similarity score is high, then a visual texture or material item descriptor might get a relatively high weighting for this type of item.

Figure 6A:
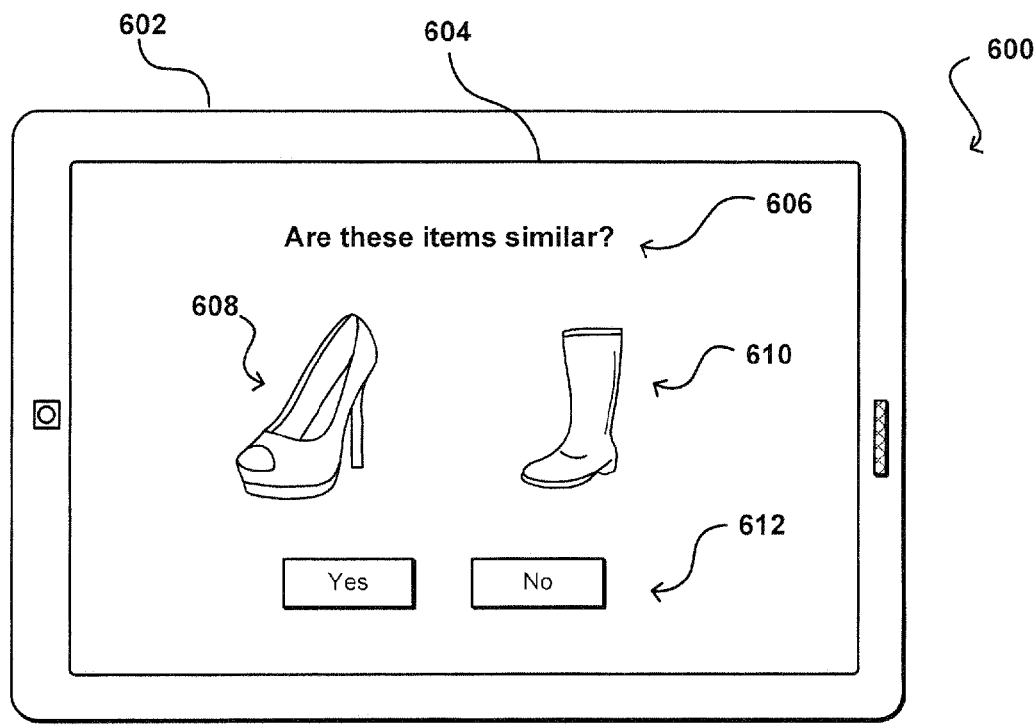
FIGS. 6(a) and 6(b) illustrate example interfaces that can be used to capture subjective similarity data in accordance with various embodiments.
Figure 6B:
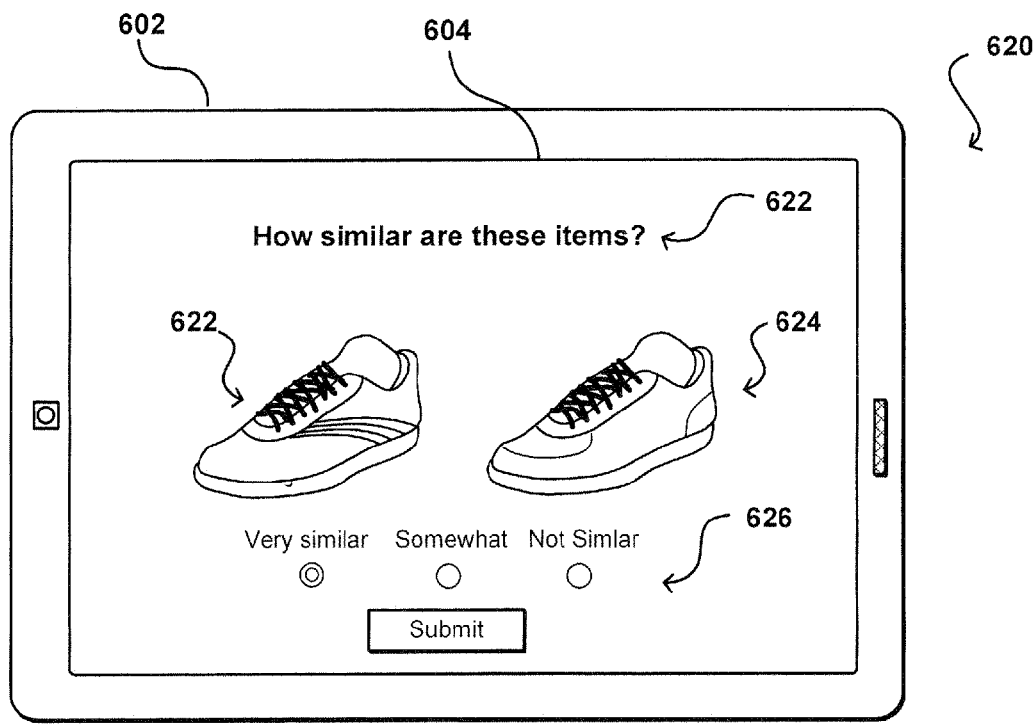

Another example 620 is provided in FIG. 6(*b*). In this example the user is asked a question 620 enabling the user to provide a more granular answer 626 with respect to the relatedness of the items in two images 622, 624 based on visual inspection. In this case, the two shoes have a similar style or shape, but very different colors and textures. Using pairs that have one or two dominant item descriptors in common can help to more quickly determine the relative contribution of each of these descriptors on the overall similarity score. In some cases, the two items presented can be items that are produced using a current selection of weightings and item descriptors, in order to test the accuracy of the current approach and make any necessary adjustments based on the user input. If any item pairs get extremely low scores, those items might be flagged as not sufficiently similar or have another such value set. Items with high similarity scores might be flagged to be automatically displayed together when a user is interested in one of the items. Various other approaches can be used as well, such as by asking a user to rank how important each item descriptor is in making a selection, etc.

Various types of user behavior can be captured as user generated data as well. For example, items that a user looks at during a single session can receive an increase in their visual similarity score. If a user selects an item to view directly from a page showing the primary item of interest, that item might have a greater adjustment in the similarity score. If the user actually purchases that item, the visual similarity score for that pair might be increased even more. Similarly, if users rarely view one of the suggested similar items then the visual similarity score for that pair of items can be decreased by an appropriate amount.

The user data can also be utilized at one or more levels or categorizations for each item. For example, a user selecting to view a similar women's running show might have that selection adjust user generated similarity scores for a shoes category, a women's shoes sub-category, a women's running shoes sub-category, and so on. Similarly, data can be aggregated by colors of shoes, price points, or other such factors. For example, users interested in a black shoe might be interested in other black shoes, while users looking for a red shoe might be interested in colorful shoes, but not necessarily red shoes. Various other ways of aggregating and applying the data can be used as well within the scope of the various embodiments.

Once a model or profile is generated indicating how users of a type of item determine visual similarity, that model or profile also can be used to make various predictions about that type of item. For example, a retailer can run an image of a shoe the retailer is considering for order and view the items that come up as similar. The retailer can analyze the similar shoes and, based at least in part upon whether the similar shoes were popular and/or profitable, can determine whether or not to order that shoe. Similarly, a designer of shoes might use the information as far as what is most important from a visual similarity standpoint to customers of certain items, and can alter the design of future shoes with those guidelines in mind. The designer then can run each potential design through the model to see which shoes a user would consider to be visually similar, in order to get an idea of the type of customer who would buy that shoe, and what the customer might be willing to pay for that shoe based in part upon the similar items. Various other approaches can be used as well within the scope of the various embodiments.

Figure 7:
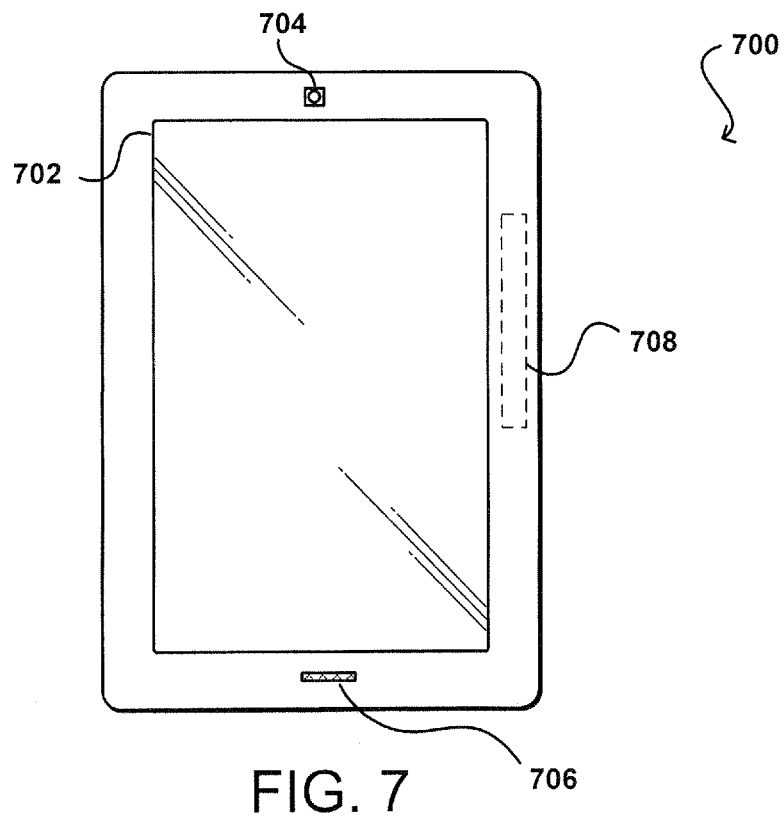
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video. The example computing device 700 also includes at least one microphone 706 or other audio capture device capable of capturing audio data, such as words or commands spoken by a user of the device. The example computing device 700 also includes at least one communication mechanism 708, such as may enable the device to utilize a wired and/or wireless connection to communicate over at least one network, such as a cellular network, the Internet, and the like.

Figure 8:
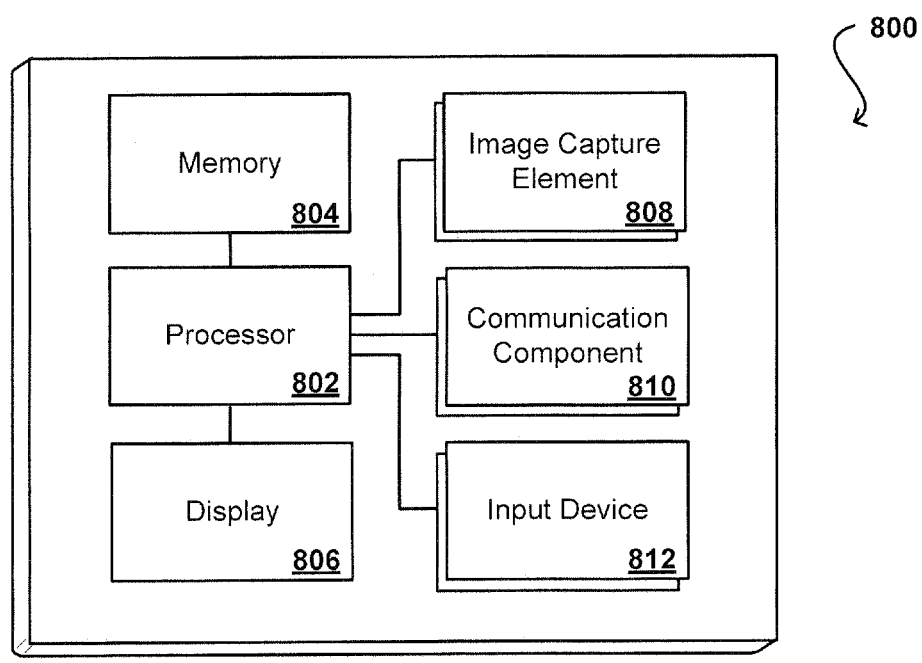
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 1108 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. The example device similarly includes at least communication component 810, such as a Wi-Fi, Bluetooth, RF, wired, or wireless communication system. The device in many embodiments can communicate with a network, such as the Internet, and may be able to communicate with other such devices. In some embodiments the device can include at least one additional input device 812 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving an image, the image including a representation of an item, the item being associated with a type of item;
determining a plurality of similar items based at least in part upon the type of item represented in the image;
determining a set of descriptors for at least one similar item of the plurality of similar items, each descriptor providing a score that indicates a relatedness of a visual aspect between the item and the at least one similar item of the plurality of similar items;
obtaining subjective user-generated visual similarity data for the type of the item from at least one data store;
determining, based on the subjective user-generated visual similarity data, a set of weighting to be applied to the set of descriptors;
determining a subjective visual similarity score for each similar item of the plurality of similar items by applying each respective weighting to a respective value of a respective descriptor for each similar item of the plurality of similar items;
monitoring user activity associated with the plurality of similar items; and
updating the subjective user-generated visual similarity data and the corresponding set of weightings to be applied to each respective set of descriptors based on the user activity, wherein the updated subjective user-generated visual similarity data is stored in the at least one data store and the updated corresponding set of weightings are used in subsequent determinations of subjective visual similarity scores for the type of item.

2. The computer-implemented method of claim 1, wherein the user activity associated with the plurality of similar items includes interaction of a user with the plurality of similar items.

3. The computer-implemented method of claim 2, wherein the interaction includes at least one of viewing one of the similar items or purchasing one of the similar items.

4. The computer-implemented method of claim 1, wherein the set of descriptors include a descriptor for at least one of shape, style, color, visual texture, patterning, and material appearance.

5. A computer-implemented method, comprising:
identifying an item in response to a request from a computing device;
determining a type associated with the item;
determining subjective user-generated visual similarity data for the type associated with the item;
identifying one or more similar items based at least in part on the type associated with the item and the subjective user-generated visual similarity data;
monitoring user activity associated with the one or more similar items; and
updating the subjective user-generated visual similarity data for the type based on the user activity, wherein the updated subjective user-generated visual similarity data is stored in at least one data store and is used in subsequent identifications of one or more similar items for the type.

6. The computer-implemented method of claim 5, wherein each of the one or more similar items has a value for each of a plurality of item descriptors with respect to the item, the item descriptors each relating to a visual aspect of the type associated with the item, and
wherein the subjective user-generated visual similarity data is used to adjust the values of the item descriptors for the one or more similar items.

7. The computer-implemented method of claim 6, wherein the subjective user-generated visual similarity data is used to define a weighting of each of the item descriptors.

8. The computer-implemented method of claim 7, further comprising calculating a visual similarity score for each of the one or more similar items by:
multiplying each of the plurality of item descriptors by a corresponding weighting to create a plurality of weighted item descriptors; and
averaging the plurality of weighted item descriptors.

9. The computer-implemented method of claim 8, wherein the monitored user activity includes one or more of viewing at least one similar item or purchasing the at least one similar item, and wherein updating the subjective user-generated visual similarity data for the type based on the user activity comprises adjusting the weighting to increase the visual similarity score for the at least one similar item.

10. The computer-implemented method of claim 8, wherein the monitored user activity includes one or more of viewing at least one similar item or purchasing the at least one similar item, and wherein updating the subjective user-generated visual similarity data for the type based on the user activity comprises adjusting the weighting to decrease the visual similarity score for the at least one similar item.

11. The computer-implemented method of claim 5, wherein identifying an item in response to a request from a computing device includes analyzing information in the request using at least one of an image recognition algorithm, an object identification algorithm, a facial recognition algorithm, an optical character recognition algorithm, a barcode recognition algorithm, a browsing context, or a text recognition algorithm.

12. The computer-implemented method of claim 5, further comprising:
causing a survey to be displayed, the survey including one or more questions used to determine a similarity of a plurality of items;
receiving an input corresponding to the one or more questions; and
updating the subjective user-generated visual similarity data based at least on the input.

13. A computing device, comprising:
   at least one processor; and
   a memory device including instructions that, when executed by the at least one processor, cause the computing device to:
   identify an item in response to a request from a computing device;
   determine a type associated with the item;
   determine subjective user-generated visual similarity data for the type associated with the item;
   identify one or more similar items based at least in part on the type associated with the item and the subjective user-generated visual similarity data;
   monitor user activity associated with the one or more similar items; and
   update the subjective user-generated visual similarity data for the type based on the user activity, wherein the updated subjective user-generated visual similarity data is stored in at least one data store and is used in subsequent identifications of one or more similar items for the type.

14. The computing device of claim 13, wherein each of the one or more similar items has a value for each of a plurality of item descriptors with respect to the item, the item descriptors each relating to a visual aspect of the type associated with the item, and
   wherein the subjective user-generated visual similarity data is used to adjust the values of the item descriptors for the one or more similar items.

15. The computing device of claim 14, wherein the subjective user-generated visual similarity data is used to define a weighting of each of the item descriptors.

16. The computing device of claim 15, further comprising calculating a visual similarity score for each of the one or more similar items by:
   multiplying each of the plurality of item descriptors by a corresponding weighting to create a plurality of weighted item descriptors; and
   averaging the plurality of weighted item descriptors.

17. The computing device of claim 16, wherein the monitored user activity includes one or more of viewing at least one similar item or purchasing the at least one similar item, and wherein updating the subjective user-generated visual similarity data for the type based on the user activity comprises adjusting the weighting to increase the visual similarity score for the at least one similar item.

18. The computing device of claim 16, wherein the monitored user activity includes one or more of viewing at least one similar item or purchasing the at least one similar item, and wherein updating the subjective user-generated visual similarity data for the type based on the user activity comprises adjusting the weighting to decrease the visual similarity score for the at least one similar item.

19. The computing device of claim 13, wherein identifying an item in response to a request from a computing device includes analyzing information in the request using at least one of an image recognition algorithm, an object identification algorithm, a facial recognition algorithm, an optical character recognition algorithm, a barcode recognition algorithm, a browsing context, or a text recognition algorithm.

20. The computing device of claim 13, further comprising:
   causing a survey to be displayed, the survey including one or more questions used to determine a similarity of a plurality of items;
   receiving an input corresponding to the one or more questions; and
   updating the subjective user-generated visual similarity data based at least on the input.

* * * * *